Aug. 11, 1931.     R. B. BOURNE     1,818,375
SILENCER
Filed May 2, 1928
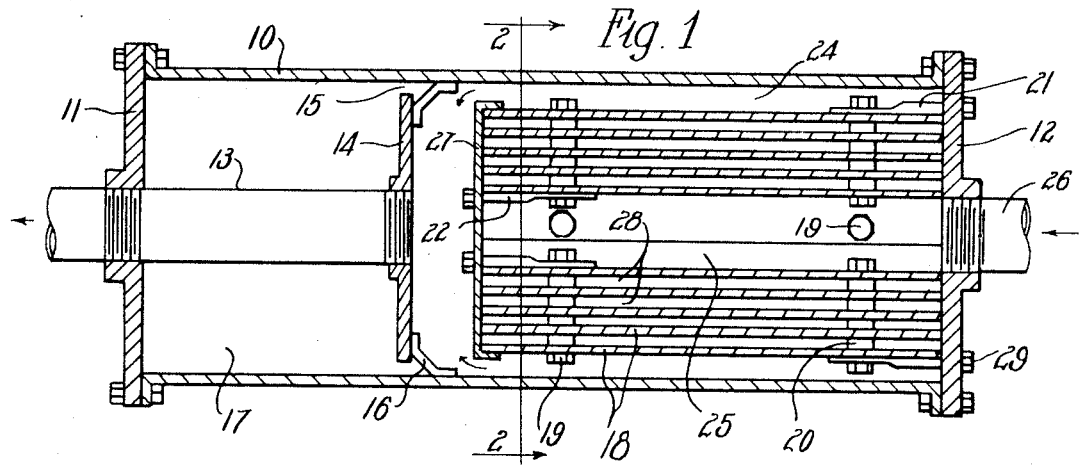
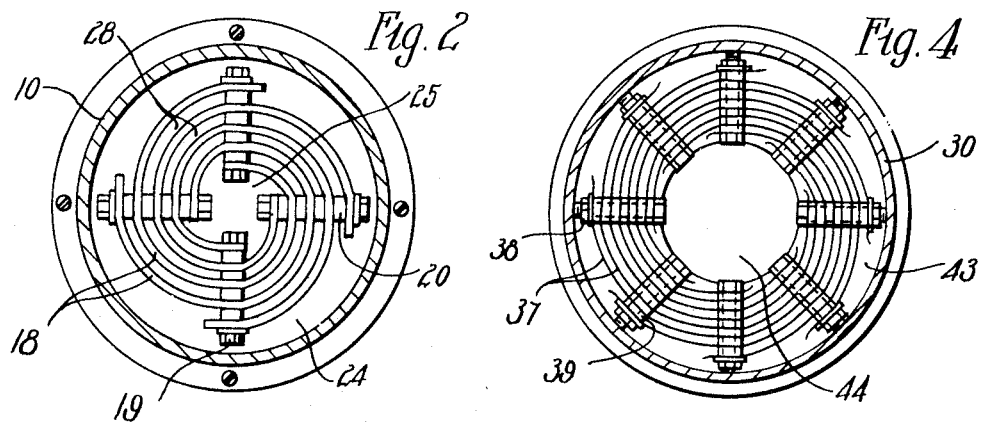
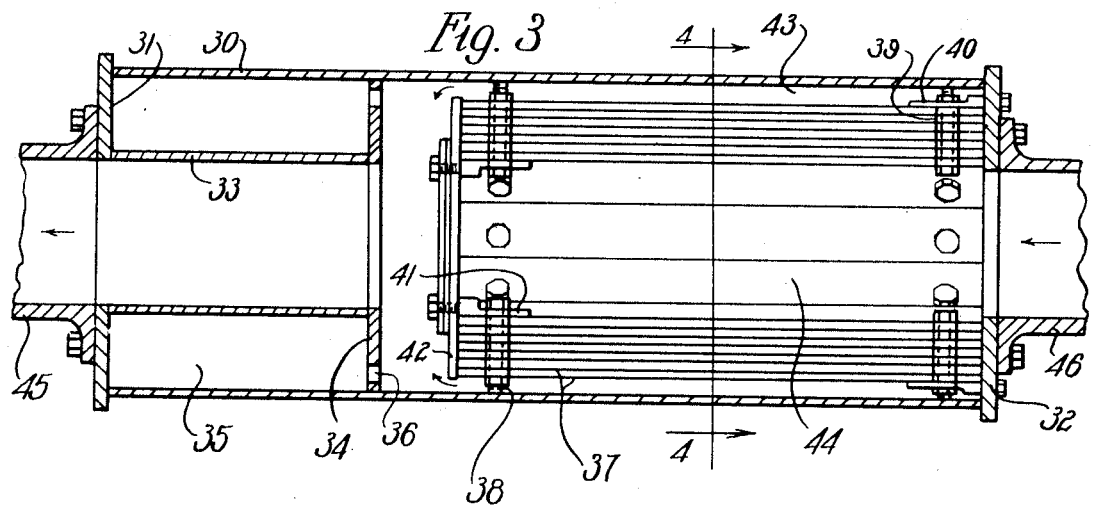
INVENTOR.
Roland B. Bourne
BY Chapin & Neal
ATTORNEYS.

Patented Aug. 11, 1931

1,818,375

UNITED STATES PATENT OFFICE

ROLAND B. BOURNE, OF HARTFORD, CONNECTICUT, ASSIGNOR, BY MESNE ASSIGN-
MENTS, TO THE MAXIM SILENCER COMPANY, OF HARTFORD, CONNECTICUT, A COR-
PORATION OF CONNECTICUT

SILENCER

Application filed May 2, 1928. Serial No. 274,644.

This invention relates to silencers for the exhausts of internal combustion engines, the discharge of vacuum pumps, the intake of blowers, air compressors or the like, and has for its object the provision of a simple and economical structure capable of freely conducting a gaseous medium to or from such apparatus while limiting the transmission of sound waves therethrough. This application is a continuation in part of my copending application Serial No. 251,674, filed February 3, 1928.

The invention will be described with reference to the accompanying drawings, in which:

Fig. 1 is a longitudinal section through one form of apparatus embodying my invention;

Fig. 2 is a transverse section on line 2—2 of Fig. 1;

Fig. 3 is a longitudinal section through a form of apparatus slightly differing in some constructional details; and Fig. 4 is a section on line 4—4 of Fig. 3.

Referring first to the form shown in Fig. 1, the silencer is formed of an outer cylindrical casing 10 closed at its ends by centrally perforated headers 11 and 12. A pipe 13, preferably serving as an outlet, extends through the header 11 and has mounted on its inner end a circular flange 14 which extends to within a short distance of the outer casing 10 so as to form between the pipe 13 and the casing an annular chamber 17 completely closed except for the annular gap 15 between the flange 14 and the casing. Braces 16 are preferably attached to the flange 14 at spaced intervals so as to engage the inner surface of casing 10 and hold the flange in alignment with the casing without blocking the annular gap 15. By this means, the interior of the casing 10 is divided into two acoustically connected chambers, the acoustic chamber or resonator 17 and the gas expansion chamber 24.

Within the expansion chamber 24 is secured a silencing unit functioning primarily to remove high frequency sound waves by a process of attenuation. This unit is preferably of the type described and claimed in the copending application of Maxim and Bourne, Serial No. 104,458, filed April 24, 1926. As described in that application, the unit comprises a plurality of superposed spiral passages leading from a central opening to the periphery of the unit and thus into the chamber 24.

In the present case, these passages are shown as being formed by four plates 18, held between the header 12 and a header 27, spirally arranged as shown in Fig. 2, and presenting passages 28 between them. To preserve the plates in proper relation, radial bolts 19 pass through them, and washers 20 are threaded on the bolts between the plates. The unit may be held in the casing in any desired way, the securing means in the present case being lugs 21 fastened to the header 12 as by nuts 29 and having holes through which the bolts 19 pass. Header 27 is held in place by similar lugs 22. A pipe 26 passes through the header 12 into the central chamber of the unit.

The modified form shown in Figs. 3 and 4 is similar in general to that already described, and differs mainly in details which have been found to be desirable for units of fairly large size. In this case the casing 30 and the headers 31 and 32 are preferably secured together by welding, and the partition 34 is welded both to the casing and to a cylinder 33 which completes the formation of the chamber 35. Instead of the annular gap 15 of the first modification, holes 36 in the partition, preferably located near its outer edge, join the chamber 35 with the gas expansion chamber 43.

The spirally curved plates 37 are joined by bolts 38 which abut the interior of the casing as shown in Fig. 3 to keep the unit centralized, and are separated by washers or other members 39. Strap bolts 40 secured to the header 32 hold the unit axially in place, while strap bolts 41 hold the header 42, of smaller diameter, in place to close the end of the unit and force the gases to travel the multiple spiral passages between the plates 37. A central opening, leading into the unit from a flange 46, serves preferably as an inlet, and a similar opening in a flange 45 as an outlet.

In each of the described cases, the gases preferably travel in the direction of the arrows, passing first through the spiral passages in which the high frequencies are removed, and then passing by the closed acoustic or resonating chamber to the outlet. The direction of flow may, however, be reversed if desired. This form of silencer is of particular utility in installations where the major portion of the sound waves to be silenced are at or around a particular frequency. In such a case, the resonating chamber can be designed so that its natural period is approximately that of the frequency to be removed. Of course, neither the sound nor the responce of the resonator is of a pure frequency, being rather broad so that a band rather than a single frequency is removed.

What I claim is:

1. A silencer comprising a cylindrical casing, a transverse partition therein having a series of holes adjacent its periphery, a pipe extending through said partition and one end of the casing whereby an annular chamber opening only through said holes is formed, multiple spiral passageways located within a chamber formed at the other side of the partition, said passageways extending from a central space to points within said second chamber, and a communication from the central space for the passage of gas.

2. A silencer comprising a cylindrical casing, a transverse partition therein, a pipe extending through said partition and one end of the casing whereby an annular chamber is formed, a communication peripherally of the partition between said annular chamber and a second chamber formed by the partition and the other end of the casing, and multiple spiral passageways radially superimposed one upon another located within said second chamber, said passageways extending from a central space to points within said second chamber, and a communication from said central space for the passage of gas.

In testimony whereof I have affixed my signature.

ROLAND B. BOURNE.